United States Patent [19]
Owada et al.

[11] Patent Number: 6,108,098
[45] Date of Patent: *Aug. 22, 2000

[54] IMAGE PROCESSING APPARATUS AND METHOD

[75] Inventors: Mitsuru Owada, Yokohama; Hirofumi Nakajima, Numazu; Mizuki Muramatsu, Ninomiya-machi, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/767,021

[22] Filed: Dec. 16, 1996

[51] Int. Cl.⁷ .............................. G06K 15/02; G06K 9/62; G06K 9/80; H04N 1/40; H04N 1/56

[52] U.S. Cl. ............... 358/1.14; 358/1.9; 358/519; 358/534; 358/455; 382/181; 382/274

[58] Field of Search ........................ 395/109; 382/181, 382/112, 135, 274, 263, 266, 190, 195, 199, 209, 217, 218; 356/71; 358/1.14, 501, 530, 532, 401, 448, 518–519, 534–536, 456–457, 1.9

[56] References Cited

U.S. PATENT DOCUMENTS

| | | | |
|---|---|---|---|
| 5,287,204 | 2/1994 | Koizumi et al. | 358/538 |
| 5,528,703 | 6/1996 | Lee | 382/257 |
| 5,647,010 | 7/1997 | Okubo et al. | 382/135 |
| 5,768,403 | 6/1998 | Suzuki et al. | 382/165 |
| 5,799,112 | 8/1998 | De Queiroz et al. | 382/254 |

FOREIGN PATENT DOCUMENTS

| | | |
|---|---|---|
| 0665477 | 8/1990 | European Pat. Off. . |
| 0 497 466 | 8/1992 | European Pat. Off. . |
| 0 665 477 | 8/1995 | European Pat. Off. . |

*Primary Examiner*—Scott Rogers
*Attorney, Agent, or Firm*—Fitzpatrick, Cella, Harper & Scinto

[57] ABSTRACT

Color space conversion and correction processing are performed on inputted R, G and B image data 1 by an RF converter 2, and Y, M, C and K image data 3 is obtained. In the case where Y, M, C and K or Y, M and C image data is directly inputted, the RF converter 2 is passed through without being processed. Inverse processing is performed on the Y, M, C and K image data 3 by a conversion table 6 where a conversion table is set in advance, and the original R, G and B image data is obtained. An image recognition circuit 7 recognizes an image on the basis of the R, G and B image data outputted from the conversion table 6. By virtue of the above process, when an image of a specified document is to be recognized, image recognition can be performed with high precision on the basis of R, G and B image data where inverse conversion has been performed on Y, M, C and K image data or Y, M and C image data.

35 Claims, 14 Drawing Sheets

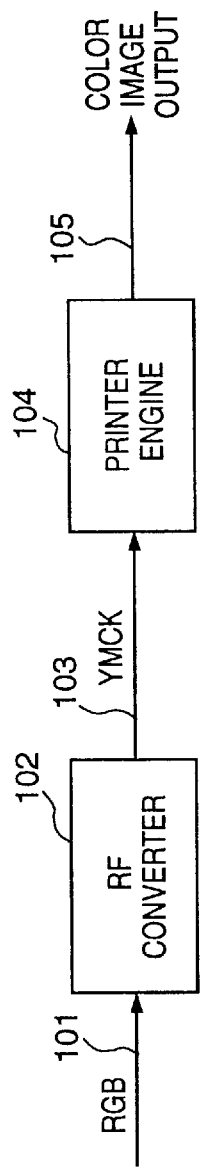
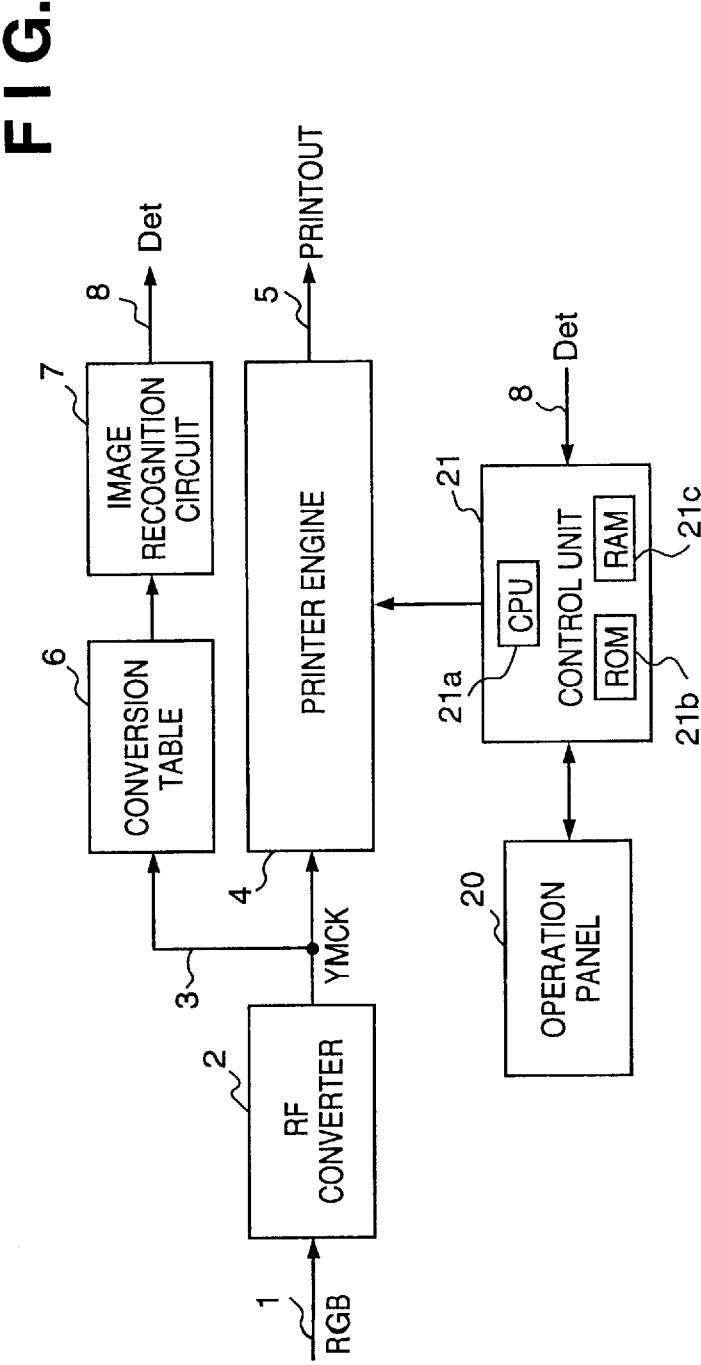

RELATIONSHIP BETWEEN LUMINANCE AND DENSITY

FIG. 11

| P(1,1) | P(2,1) | ---- | P(N,1) |
|--------|--------|------|--------|
| P(1,2) | P(2,2) | ---- | P(N,2) |
| ⋮ | ⋮ | | ⋮ |
| P(1,M) | P(2,M) | ---- | P(N,M) |

IMAGE PROCESSING APPARATUS AND METHOD

BACKGROUND OF THE INVENTION

Present invention relates to an image processing apparatus and method thereof, and more particularly to an image recognition apparatus and a method for recognizing an image represented by inputted image data, and an image processing apparatus and a method which employs the image recognition apparatus and the method.

Conventionally, color printing was unable to perform unless it was done by a professional printer, however, today, along with the penetration of color copying machine or color printer, color printing can be easily performed by anyone, and high quality full-color print can be easily obtained.

Since the law prohibits making copies of documents such as paper money, stocks or bonds, the demand is high for a technique to prevent copying (reproduction) of a document whose images should not be copied (reproduced) (hereinafter referred to as a "specified document") by employing a color copying machine or a color printer, even though such apparatuses are widely used. Prevention technique is to generate reference data based on image data of a specified document and determine whether or not an inputted image is a specified image by referring to the reference data. Most of such techniques are performed by mapping inputted image data in a memory, extracting characteristics of the input document, and performing pattern matching or fuzzy analysis or the like on the input document stored in the memory to detect characteristics of a specified document, thereby preventing copying (reproduction) of the specified document.

There is an apparatus which performs detection of such characteristics in the R, G and B color space and an apparatus which performs the same in the Y, M, C and K color space for a printer.

Image processing software recently available are capable of handling both color spaces: the R, G and B color space and the Y, M, C and K color space.

In order to output a full-color image by a printer having low tonality e.g. an inkjet printer, image processing such as dither processing or error diffusion processing or the like for increasing pseudotonality is generally performed. Such processing is performed by employing a method of representing halftone by controlling, in a unit dimension, magnitude of an area which is represented by each color components such as C, M, Y and K (hereinafter referred to as the "area halftone method"). The processing is a technique used to increase tonality in a low spatial frequency of an image. When the area halftone method is utilized, resolution of an outputted image tends to deteriorate. However on account of recent significant improvement in resolution of printers, deterioration in resolution of the outputted image is kept to a minimum level.

FIG. 1 is a block diagram showing an arrangement of a printer. Image data 101 of the R, G and B color space inputted from a host computer (not shown) or the like is converted to image data 103 of the Y, M, C and K color space for a printer by a reproduction converter 102 (hereinafter referred to as "RF converter"). In other words, the RF converter 102 converts image data from the R, G and B color space to the Y, M, C and K color space, and performs under color removal processing (hereinafter referred to as "UCR") as well as masking processing for correcting color reproducing characteristics of colorant e.g. a toner or the like, are performed. The image data 103 is then inputted to a printer engine 104 where each of color component images respectively having Y, M, C and K colors is placed on top of each other, and outputted as a color image output 105.

A printer is an image forming apparatus which forms a color image by subtractive mixture. Therefore, no matter what color space inputted data has, image data ultimately inputted into the printer engine 104 is the data converted into the Y, M, C and K color space or the Y, M and C color space.

There is also a case where the RF conversion is performed by an image processing software driven on a host computer, such as an image retouching software, a printer driver or the like. In this case, image data of the Y, M, C and K color space is directly inputted into a printer.

As set forth above, in order to determine in a printer unit whether or not an image subjected to printing is an image of a specified document, it is necessary to detect the specified document in the Y, M, C and K color space or the Y, M and C color space.

As functions of a host computer have recently improved, in most cases, image data is first converted to the Y, M, C and K or Y, M and C data form by the aforementioned image processing software before being sent to a printer. Therefore, in order to detect the specified document in the printer unit, it is necessary to recognize an image in the Y, M, C and K color space or the Y, M and C color space.

However, image recognition in the Y, M, C and K or Y, M and C color spaces raises the following problem.

In the R, G and B color space, image recognition can be performed on the basis of luminance data which has a relatively large dynamic range. On the other hand, since Y, M and C data is obtained by performing log conversion on the luminance data of R, G and B color space, the dynamic range of the Y, M and C data is compressed, making it difficult to perform accurate image recognition. Moreover, when conversion into Y, M, C and K data is performed, amplitude of each of the Y, M and C data is further compressed by the UCR processing, resulting in further deterioration of accuracy in image recognition. Furthermore, correction (gamma correction) is performed for each of the color components (Y, M, C and K) in order to correct characteristics of a printer engine. Because of the differences, the relationship between Y, M, C and K image data and original luminance data in the R, G and B color space becomes non-linear. Moreover, errors or the like generated in the conversion process also influences accuracy of the image recognition operation. Accordingly, precise image recognition cannot be performed on the basis of Y, M, C and K or Y, M and C image data.

When the "area halftone method" is utilized, accurate image recognition is possible only when the relationship between input data and output data of the area halftone processing is linear. However, if non-linear processing is included to the area halftone processing, precise image reproduction such as that will be described later becomes difficult and accurate image recognition cannot be expected.

FIG. 8 shows a relationship between a luminance signal and a density signal in general. Herein, the RF conversion will be explained in a simplified form of luminance-density conversion.

Generally, the characteristics of conversion from R, G and B data to Y, M, C and K data result in a graph in FIG. 8. The horizontal axis in FIG. 8 expresses a normalized value of luminance signals of R, G and B and the vertical axis expresses a normalized value of density signals of Y, M, C and K. For instance, when a luminance signal value is 0.3, the corresponding density signal value is 0.5.

When the conversion from R, G and B to Y, M, C and K is characterized by the graph shown in FIG. 8, if four pixels having a luminance signal value 0.3 as indicated by reference numeral 111 in FIG. 9 is inputted in the RF converter, an output of the RF converter results in the reference numeral 112 in FIG. 9. When the signal 112 is inputted to a dither processor to perform dither processing in a unit of 2×2 pixels, the signal data is converted to representation values 0 and 1 indicative of a density value, as illustrated by reference numeral 113 in FIG. 9. Printing out the signal data would result in reference numeral 114 in FIG. 9. Herein, a mean value of density in the entire printout is 0.5. In other words, the density data indicated by the reference numeral 112 in FIG. 9, where each pixel has a density value of 0.5, is expressed by the method of area halftone.

In performing image recognition, if luminance data is to be restored on the basis of the signal where the aforementioned dither processing has been performed, the above described condition of utilizing the area halftone method, that is, to have linear relationship between input data and output data, cannot be satisfied because non-linear luminance-density conversion shown in FIG. 8 is performed on the dither-processed signal. Restoring of luminance data from the dither-processed signal is equivalent to obtaining of data indicated by reference numeral 115 in FIG. 9 from the data 113 in FIG. 9 by utilizing the conversion characteristics shown in FIG. 8. Herein, a mean value of luminance data 111 is 0.3 while the mean value of the luminance data 115 is 0.5.

As described above, a printer system employing the area halftone processing e.g., dither processing or error diffusion processing, raises the problem of extreme deterioration of image recognition capability, or in the worse case, inability of image recognition operation.

SUMMARY OF THE INVENTION

The present invention has been made in consideration of the above situation, and has as its object to provide an image recognition apparatus and method thereof which is capable of performing image recognition of image data, on which some type of conversion processing has been performed, with high precision, by reducing influence of the conversion processing, and also to provide an image processing apparatus and method which employs the image recognition apparatus and the method.

To attain the above object, a preferred embodiment of the present invention comprises inverse processing means for performing an inverse conversion process of a predetermined conversion process on inputted image data on which the predetermined conversion process has been performed; and recognition means for recognizing an image represented by the image data processed by the inverse processing means.

Moreover, another object of the present invention is to provide an image recognition apparatus and method thereof which is capable of performing image recognition with high precision on the basis of image data on which pseudo half-tone processing has been performed, and an image processing apparatus and method thereof which employs the image recognition apparatus and the method.

To attain the above object, a preferred embodiment of the present invention comprises inverse processing means for performing an inverse process of pseudo half-tone processing on inputted image data on which the pseudo half-tone processing has been performed; and recognition means for recognizing an image represented by image data processed by the inverse processing means.

Furthermore, another object of the present invention is to provide an image recognition apparatus and method thereof which is capable of performing image recognition with high precision even in a case where characteristics of processing performed on the density image data is unclear.

To attain the above object, a preferred embodiment of the present invention comprises processing means for performing an inverse conversion process of a predetermined conversion process on inputted image data on which the predetermined conversion process has been performed, in accordance with a process condition set by setting means; and recognition means for recognizing an image represented by the image data processed by the inverse processing means, wherein the setting means obtains the process condition from inputted predetermined reference data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing an arrangement of a printer;

FIG. 2 is a block diagram showing an arrangement of an image processing apparatus according to an embodiment of the present invention;

FIG. 11 is a diagram for explaining operation of a mean value calculator shown in FIG. 10;

DETAILED DESCRIPTION OF THE PREFERRED EMBODIMENTS

Figure 3:
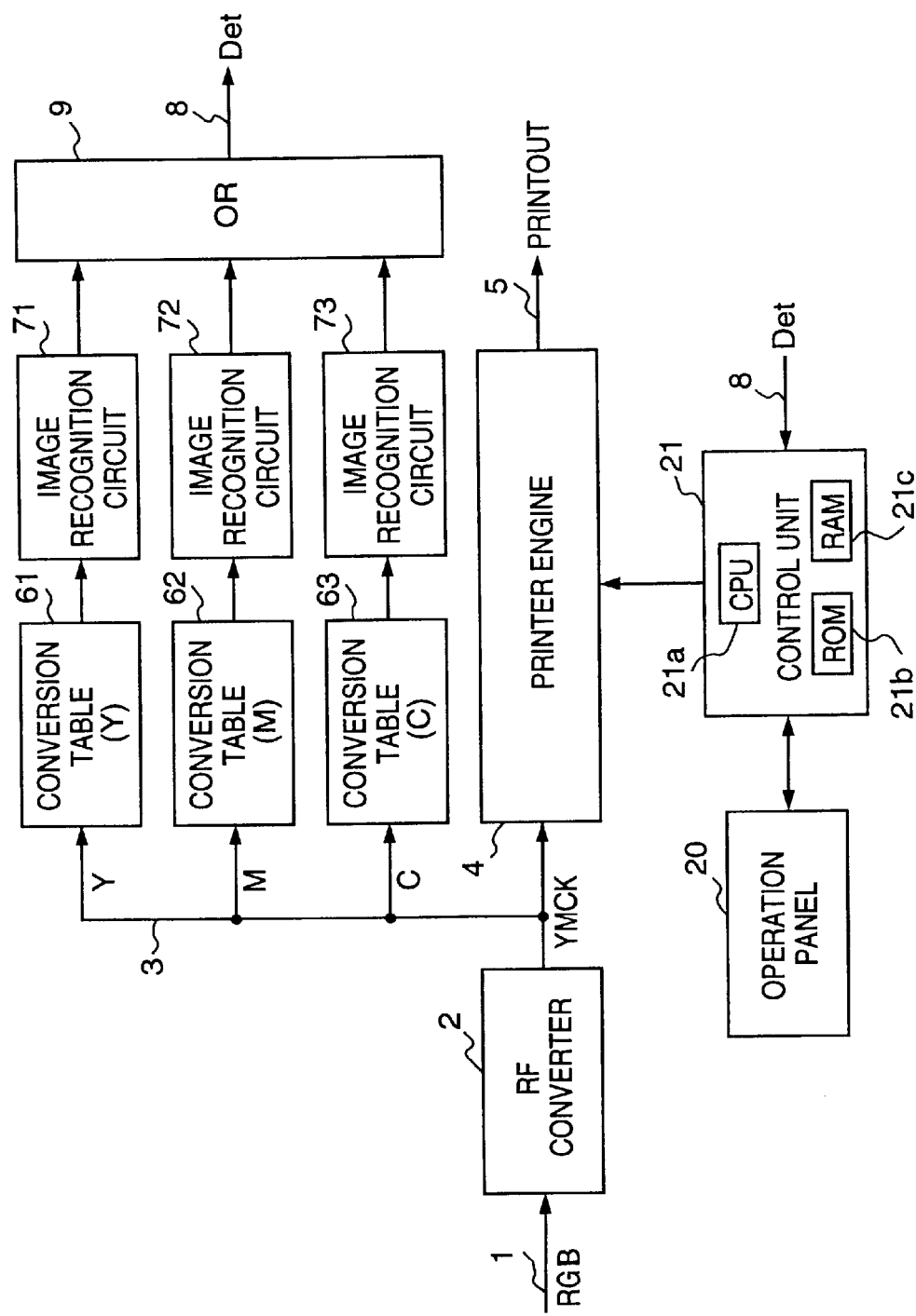
FIG. 3 is a block diagram showing an arrangement of an image processing apparatus according to the second embodiment of the present invention.

Preferred embodiments of the present invention will be described in detail in accordance with the accompanying drawings.

<First Embodiment>

FIG. 2 is a block diagram showing an arrangement of an image processing apparatus according to an embodiment of the present invention. In FIG. 2, a control unit 21 constituted with CPU 21a, ROM 21b, RAM 21c, I/O and the like controls the entire apparatus according to control programs stored in the ROM 21b. An operation panel 20 comprises a keyboard or a touch panel for inputting an operator's instruction to the control unit 21, and a display constituted with an LCD or the like where operation status and operation conditions of the apparatus are displayed by the control unit 21.

An R, G and B digital image signal 1 inputted from a host computer (not shown) or the like is converted to a Y, M, C and K digital image signal 3 by an RF converter 2. The RF converter 2 performs conversion from an R, G and B color space to a Y, M and C color space in addition to UCR processing, masking processing and density conversion (gamma correction) processing for correcting color reproducing characteristics of toner or the like.

In the case where a Y, M, C and K or a Y, M and C digital image signal is directly inputted by an image processing software driven on the host computer, the RF converter 2 is set by the operation panel 20 or the image processing software such that the inputted signal is passed through the RF converter 2 without being processed.

The Y, M, C and K digital image signal 3 outputted from the RF converter 2 is inputted to a printer engine 4 and a conversion table 6 constituted with a look-up table e.g. ROM or the like. The printer engine 4 outputs a printout 5, forming a color image on the basis of image data from the RF converter 2.

The digital image data, on which conversion to be described later is performed by the conversion table 6, is inputted to an image recognition circuit 7. The image recognition circuit 7 stores reference data of the R, G and B color space generated based on image data of specified documents. The image recognition circuit 7 determines whether or not an inputted image is an image of one of the specified documents by performing pattern matching or fuzzy analysis based on the reference data. The determination result is outputted as a signal Det 8. The control unit 21 determines in accordance with the signal Det 8 whether or not the image subjected to printing is the specified document; and if it is determined that the image to be printed is the specified document, printing operation of the printer engine 4 is suspended, or process control e.g. stopping fixing process is performed, or image data is deformed e.g., printing out an all-black image, to impede printing of the exact image of the specified document.

Herein, an example of setting the conversion table 6 will be provided.

The reference image signal 1 of the R, G and B color space representing predetermined color patches are inputted to the apparatus and the above described color space conversion and correction processing are performed on the signal 1 by the RF converter 2 to obtain an image signal 3 of the Y, M, C and K color space. Based on a correlation between the reference image signal 1 and the obtained image signal 3, the most appropriate inverse conversion table data for inverse-converting the Y, M, C and K image data outputted from the RF converter 2 into R, G and B image data is obtained. The inverse conversion table data obtained in the above manner may be written in the conversion table 6 when the apparatus is shipped to a user.

Further, in consideration of the case where a C, M, Y and K image signal or a C, M and Y image signal is directly inputted and passed through the RF converter 2 without being processed, characteristics of the RF conversion in a typical image processing software may be obtained, and the most appropriate inverse conversion table for such conversion characteristics, for example, an inverse conversion table corresponding to average characteristics of the conversion characteristics, can be set. When a signal passes through the RF converter 2 without being processed, the conversion table 6 can be switched to such conversion table corresponding to the average characteristics.

The image signal inverse-converted from the Y, M, C and K color space to the R, G and B color space by the conversion table 6 obtained in the above manner is free of influences of color space conversion and various correction processing by the RF converter 2. Because the RF conversion by the RF converter 2 employs various processing e.g., color space conversion, UCR, masking, correction of engine characteristics and so on, the outputted Y, M, C and K image data has a low image contrast in appearance, particularly due to the influence of UCR processing. The conversion table 6 serves to remove the influence of the various characteristics of the RF converter 2 and to reproduce image data which is consistent with the original R, G and B digital image data.

Therefore, on account of the conversion table 6, the influence of RF conversion can be removed from image data inputted to the image recognition circuit 7; and as a result, the contrast of image data can be enhanced thereby improving accuracy in determining an image of the specified document. Note that in the above description, an example is provided based on Y, M, C and K image data. The same concept is applicable to a case of Y, M and C image data to realize image recognition.

As set forth above, according to the first embodiment, an image can be recognized with high precision on the basis of Y, M, C and K image data or Y, M and C image data on which RF conversion has been performed. If the image is determined as a specified document, printing of the exact image of the inputted image data is impeded by suspending printing operation or by other similar operation.

<Second Embodiment>

Hereinafter, an image processing apparatus according to a second embodiment of the present invention will be described.

Note that in the second embodiment, the same reference numerals are assigned to compositional parts identical to those in the first embodiment and descriptions thereof will be omitted.

FIG. 3 is a block diagram showing an arrangement of an image processing apparatus according to the second embodiment of the present invention. The configuration differs from that of the first embodiment shown in FIG. 3 in that the conversion table and the image recognition circuit are provided for each of the Y, M and C color components. That is, the apparatus comprises a conversion table 61 and an image recognition circuit 71 for an yellow component, a conversion table 62 and an image recognition circuit 72 for a magenta component, and a conversion table 63 and an image recognition circuit 73 for a cyan component. Moreover, determination results obtained from the three image recognition circuits are subjected to OR calculation by an OR circuit 9 to obtain a signal Det 8.

The most appropriate conversion table has different characteristics for each of the color components. Therefore, it is possible to obtain the most appropriate recognition characteristics for an entire image by providing a most appropriate conversion table for each of the color components and performing correction in the respective color component. In this case, the image recognition circuit 71 stores reference data having red and green components in the R, G and B color space, which correspond to yellow in the Y, M and C color space; the image recognition circuit 72 stores reference data having blue and red color components which correspond to magenta; and the image recognition circuit 73 stores reference data having green and blue color components which correspond to cyan.

Note that the conversion tables are not limited to three colors (Y, M and C) but may be provided for any plural colors; for instance, in the case of four colors Y, M, C and K, the same effects can be attained. Furthermore, the determination results need not be processed by the OR circuit 9 to obtain the signal Det 8, but each of the determination results may be directly inputted to the control unit 21. Moreover, the number of the set of conversion table and a image recognition circuit can be changed in accordance with an image forming mode (four-color forming mode or three-color forming mode).

Figure 4:
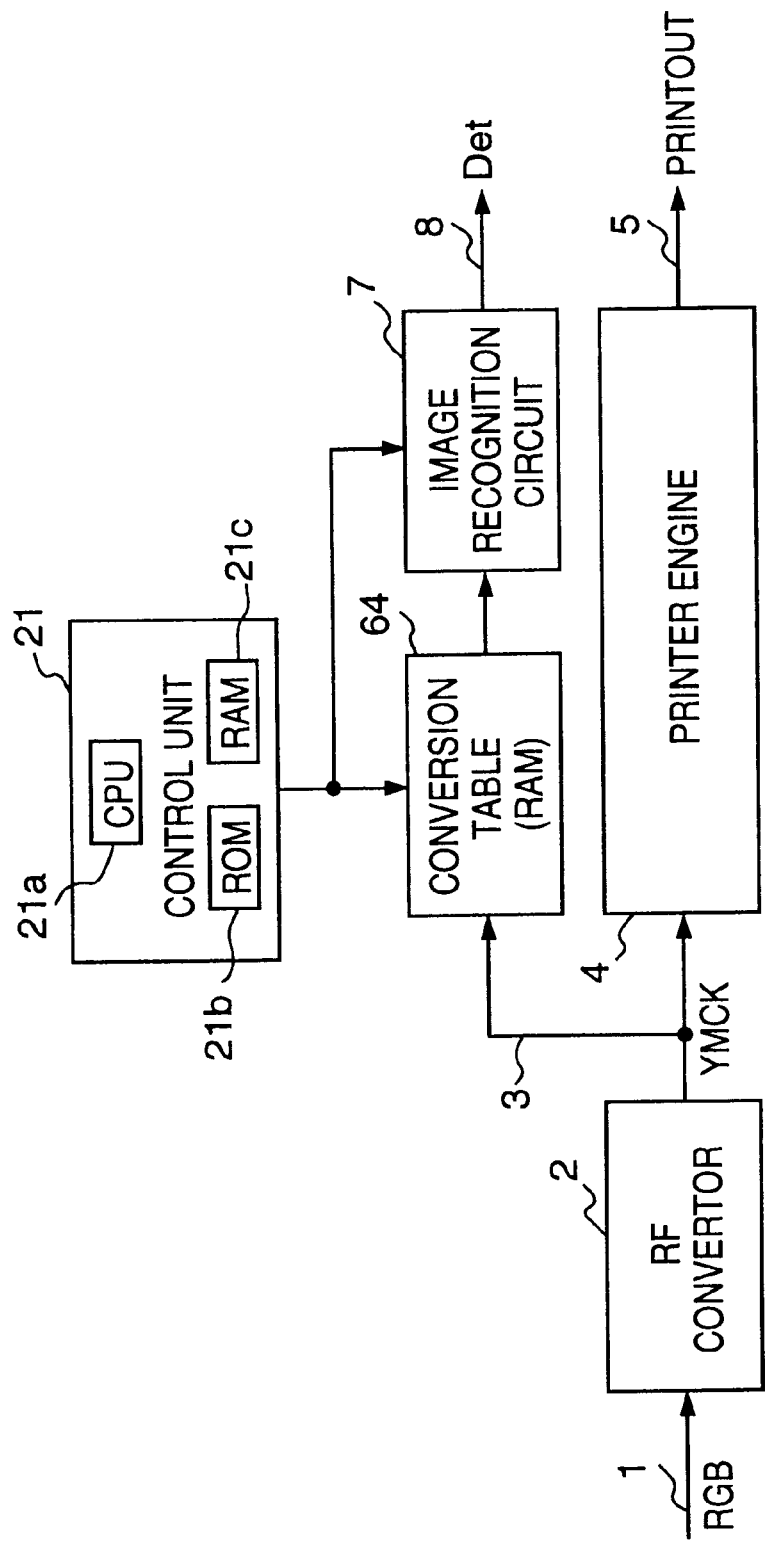
FIG. 4 is a block diagram showing a modified example of the second embodiment.

Further as shown in FIG. 4, it is also possible to constitute each of the conversion table 64 and the reference data storing unit of the image recognition circuit 7 with a RAM, to perform image recognition by setting the conversion table 64 according to e.g., a processing color of the printer engine 4, and setting a combination of color components of reference data corresponding to the processing color in the image recognition circuit 7. In this case, a conversion table for each of the C, M and Y color components and reference data for each of the R, G and B color components are predeterminedly stored in the ROM 21b of the control unit 21.

<Third Embodiment>

Hereinafter, an image processing apparatus according to the third embodiment of the present invention will be described.

Note that in the third embodiment, the same reference numerals are assigned to compositional parts identical to those in the first embodiment and description thereof will be omitted.

Figure 5:
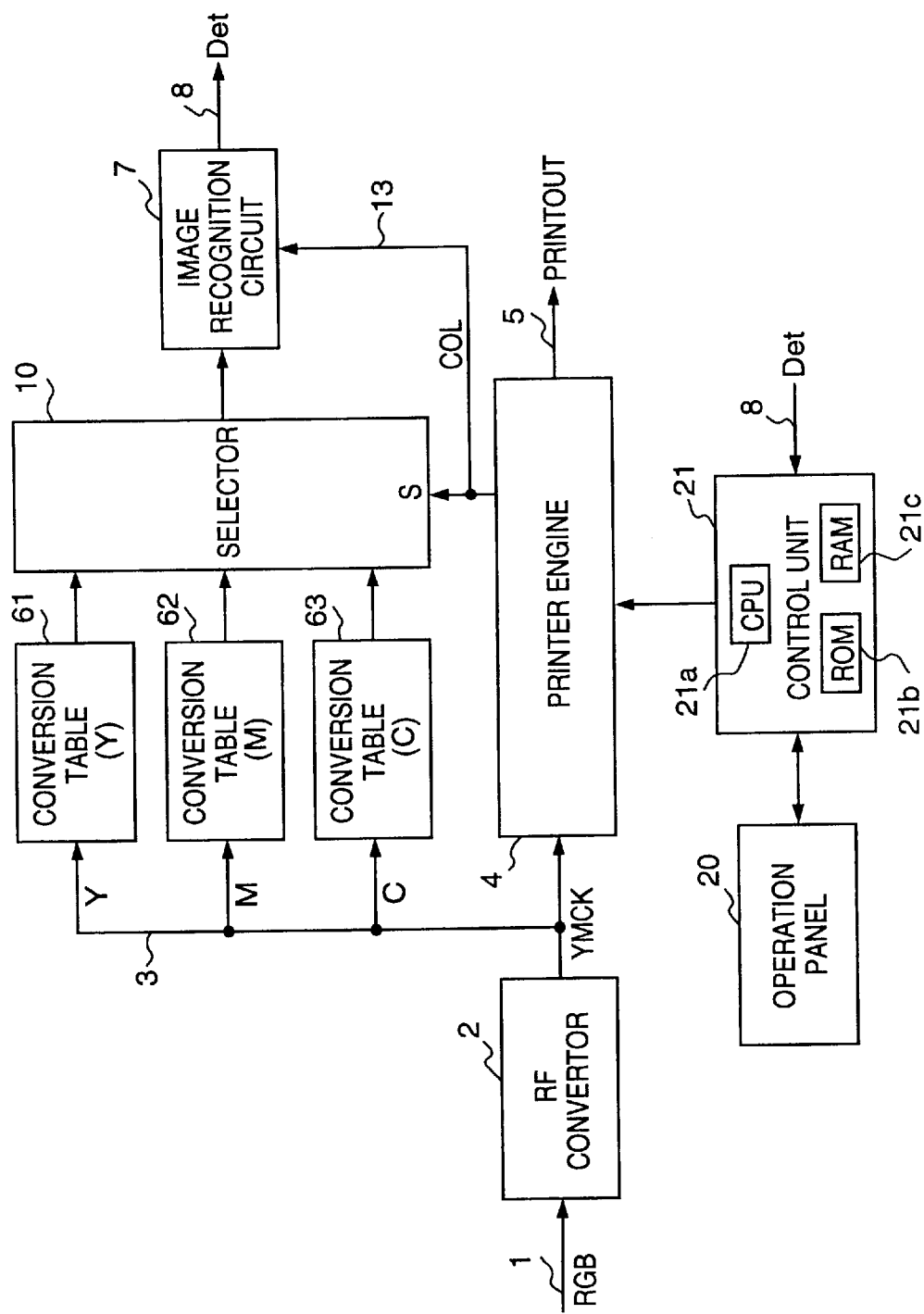
FIG. 5 is a block diagram showing an arrangement of an image processing apparatus according to the third embodiment.

FIG. 5 is a block diagram showing an arrangement of an image processing apparatus according to the third embodiment. The apparatus differs from the arrangement of each of the foregoing embodiments by comprising a selector 10 for selecting an output from three conversion tables in accordance with a processing color signal COL 13, and by performing image recognition in accordance with the output of the selected conversion table.

The printer engine 4 outputs the processing color signal COL 13 indicative of a processing color component, that is, a color component of an image being formed. The selector 10 selects a conversion table of the processing color, for instance, when the printer engine 4 forms an image having yellow component, the selector 10 selects the conversion table 61 for yellow. The image recognition circuit 7 changes a combination of color components of reference data in accordance with the processing color signal COL 13 to perform image recognition.

Figure 6:
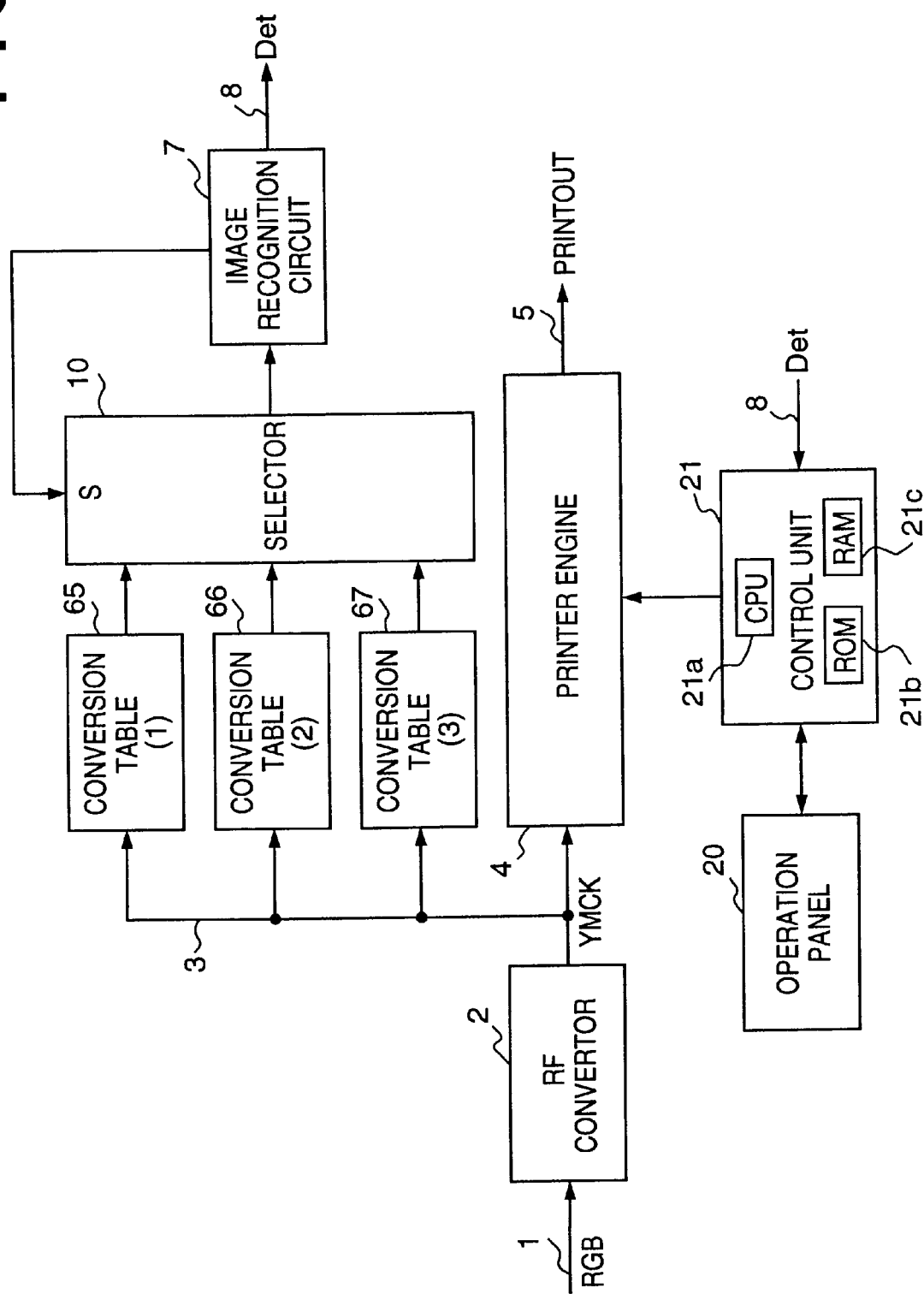
FIG. 6 is a block diagram showing a modified example of the third embodiment.

As shown in FIG. 6, it is also possible for the image recognition circuit 7 to control the selector 10 in accordance with characteristics of an image subjected to image recognition. By virtue of this, image recognition can be performed on the image data which has been inverse-converted by the most appropriate conversion table corresponding to the characteristics of an image of the specified document.

Moreover, the conversion table may be constituted with a rewritable memory e.g. RAM or the like, and conversion table data may be set for each color in accordance with the processing color signal COL 13.

<Modifications of the First to Third Embodiments>

Figure 7:
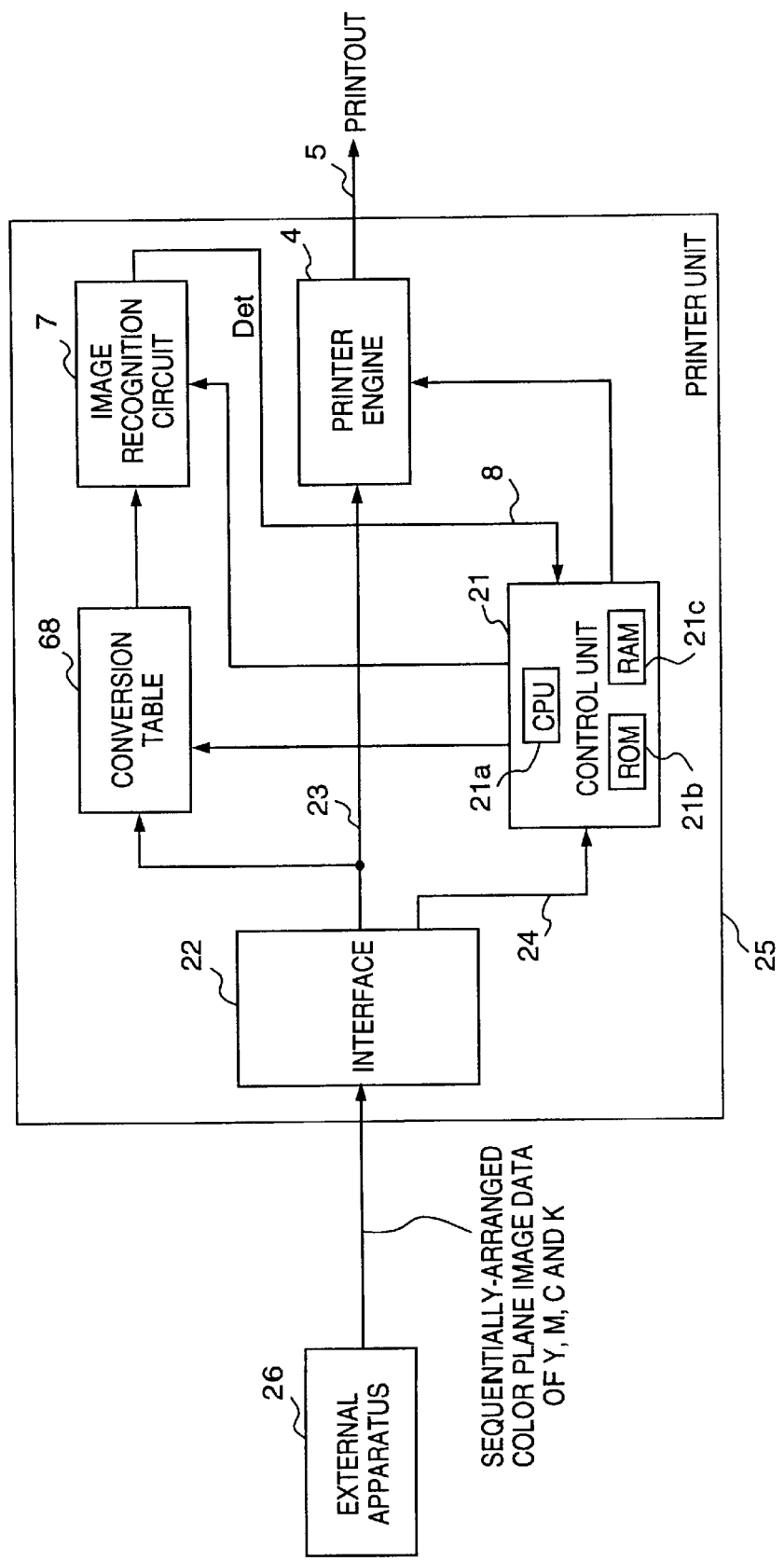
FIG. 7 is a block diagram showing a modified example of an image processing apparatus according to the first, second and third embodiments.
Figure 8:
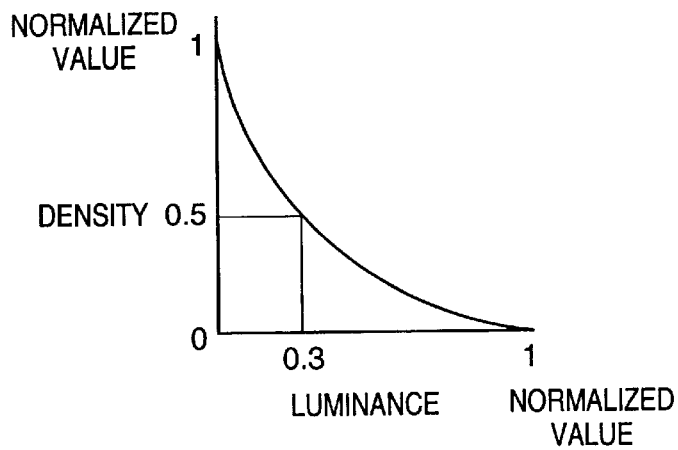
FIG. 8 is a graph showing a general relationship between a luminance signal and a density signal.
Figure 9:
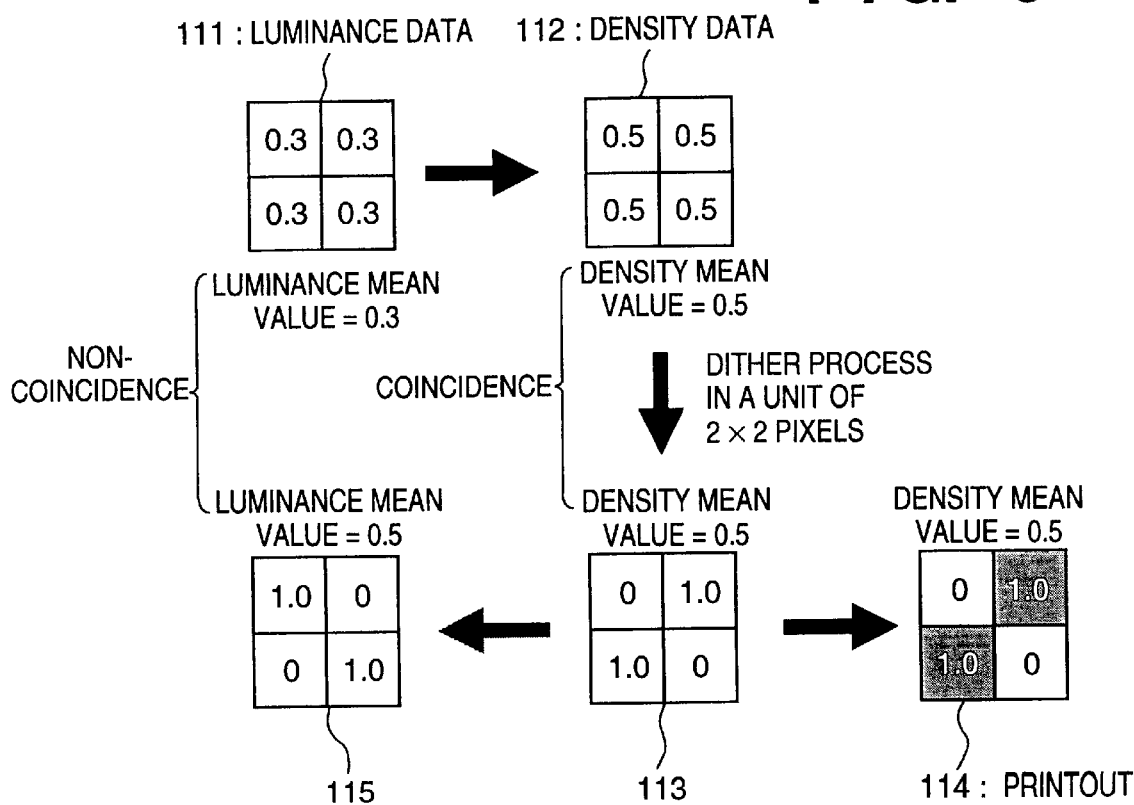
FIG. 9 is a diagram for explaining luminancedensity conversion and dither processing.

In the foregoing embodiments, descriptions have been given in the case where image data of the R, G and B color space is inputted from a host computer. As shown in FIG. 7, the present invention can also be applied to a case of sequentially-arranged color plane image data (a form of data arranged in a way that each color-plane image data of Y, M, C and K color planes or Y, M and C color planes is inputted sequentially) from an external apparatus 26 e.g., a host computer or image scanner and the like, to a printer unit 25.

In FIG. 7, the sequentially-arranged color plane image data in Y, M, C and K inputted from the external apparatus 26 e.g., a host computer, is inputted to the printer unit 25 via an interface 22. The interface 22 outputs color instruction data 24 indicating color of the color plane data currently inputted or to be inputted, and sequentially outputs Y, M, C and K color plane data 23 to a conversion table 68 and the printer engine 4.

According to the color instruction data 24, the control unit 21 sets conversion table data corresponding to the color plane in the conversion table 68, and sets a combination of color components of reference data which corresponds to the color plane in the image recognition circuit 7.

If a determination result by the image recognition circuit 7 indicates that at least one of the color planes (one of Y, M, C and K) is the specified image, the control unit 21 performs the processing described in the first embodiment to impede the printing, such as changing the process of the printer engine 4.

As set forth above, according to the first to third embodiments and the modified embodiment, it is possible to provide an image processing method and apparatus thereof which is capable of performing image recognition with high precision on the basis of density image data such as Y, M, C and K image data or Y, M and C image data. When an image of the specified document is determined, it is possible to impede printing of the exact image of inputted image data.

<Fourth Embodiment>

An image processing apparatus according to a fourth embodiment of the present invention will be described below.

Note that in the fourth embodiment, the same reference numerals are assigned to compositional parts identical to those in the first embodiment and descriptions thereof will be omitted.

Figure 10:
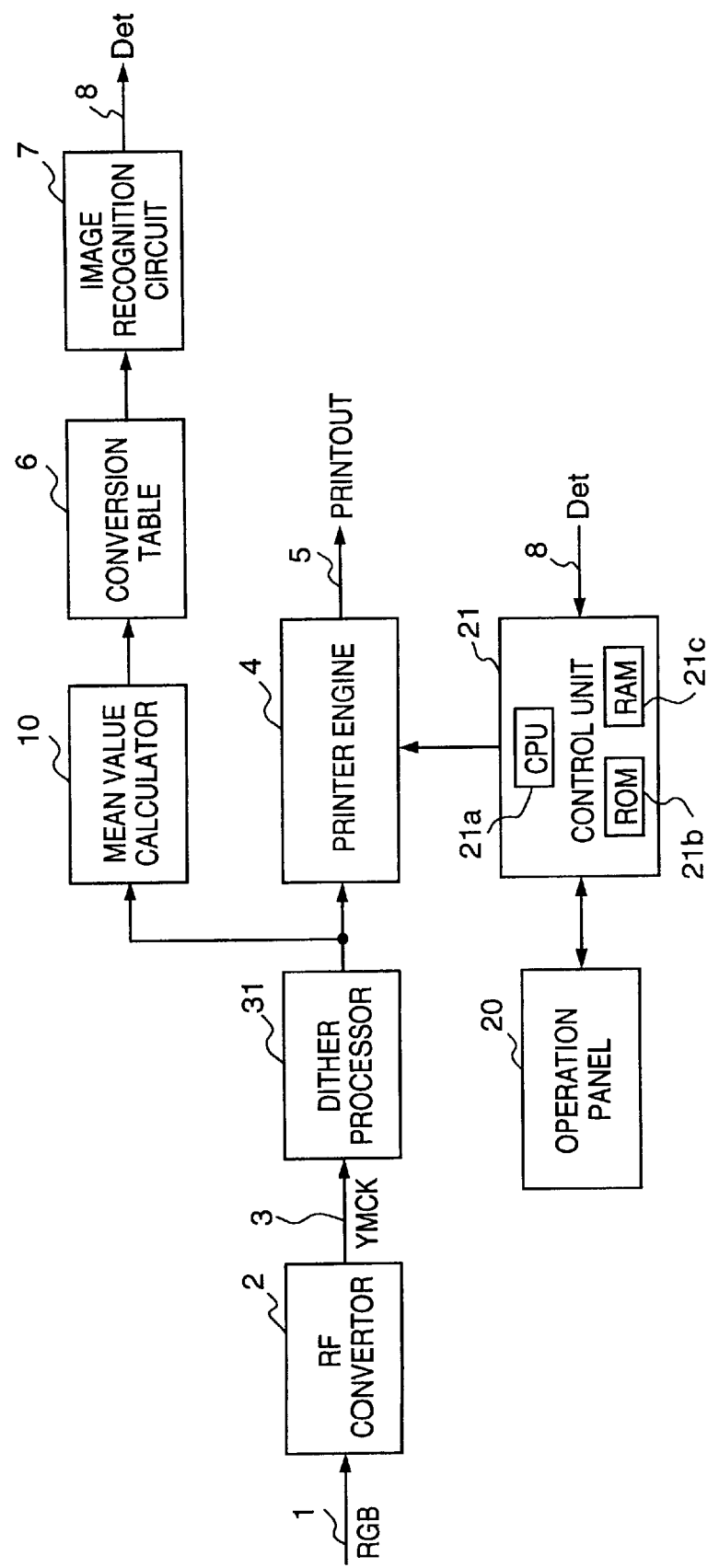
FIG. 10 is a block diagram showing an arrangement of an image processing apparatus according to the fourth embodiment of the present invention.

FIG. 10 is a block diagram showing an arrangement of an image processing apparatus according to the fourth embodiment of the present invention.

The Y, M, C and K digital image signal 3 outputted from the RF converter 2 is inputted to a dither processor 31 for dither processing, thereafter inputted to the printer engine 4 and a mean value calculator 32. The printer engine 4 outputs a printout 5, forming a color image on the basis of the image data inputted from the dither processor 31. Note that in case where an image signal on which pseudo half-tone processing e.g., dither processing or the like, has been performed is inputted by an image processing software driven on a host computer, the dither processor 31 is so set by the operation panel 20 or the image processing software that the inputted signal is passed through the processor 31 without being processed.

The image data inputted in the mean value calculator 32 is subjected to mean value calculation and inputted in the conversion table 6 constituted by a ROM or the like. The conversion table 6 performs non-linear conversion of converting inputted density data to luminance data. Digital image data converted by the conversion table 6 is inputted to the image recognition circuit 7.

After the determination result of the image recognition circuit 7 is outputted as a signal Det 8, the control unit 21 determines based on the signal Det 8 whether or not the image to be printed is an image of the specified document, and if it is determined that the image to be printed is the specified document, printing of the exact image thereof is impeded.

Figure 11:
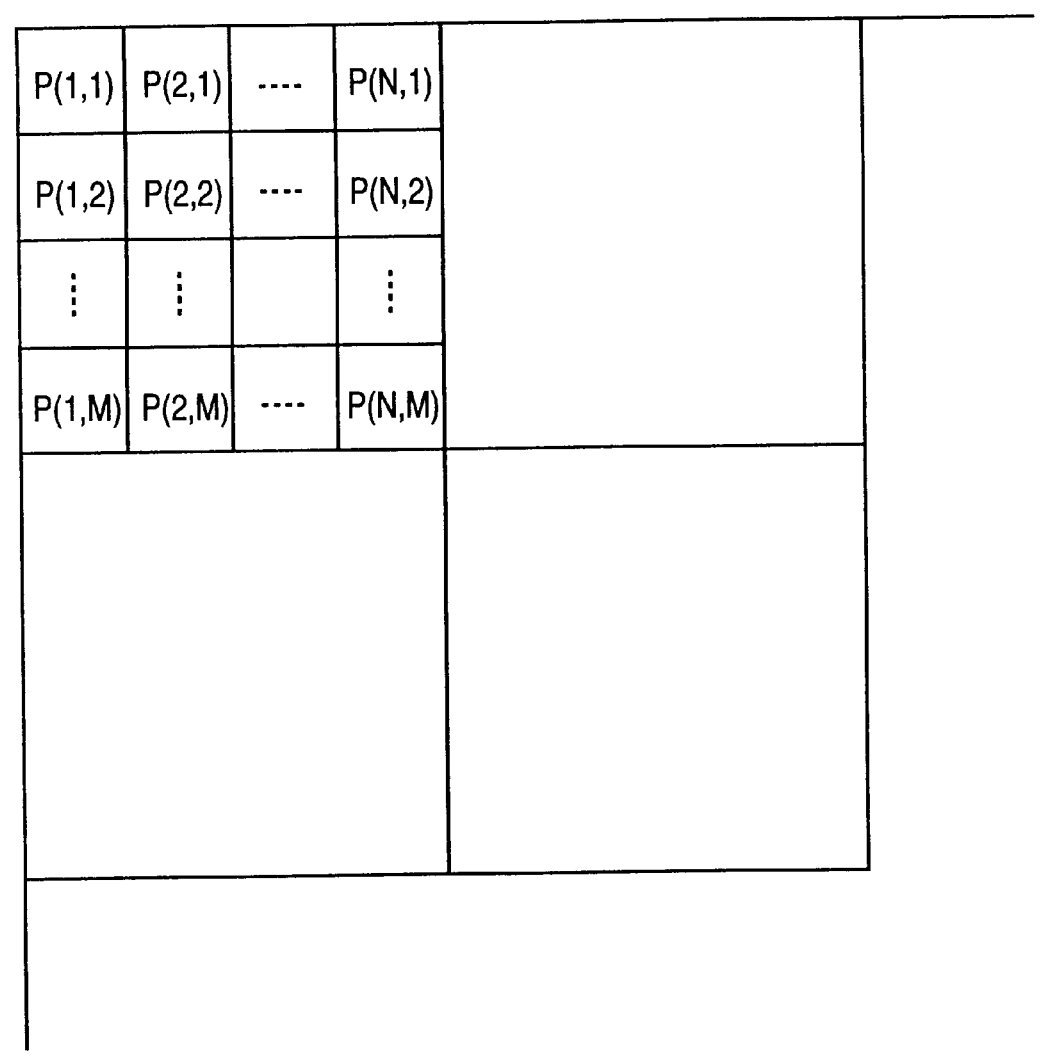

Herein, the mean value calculation performed by the mean value calculator 32 operates to reduce the influence of dither processing from the dither-processed image data. FIG. 11 is provided to explain operation of the mean value calculator 32, showing output image data of the dither processor 31. Reference symbol P(x,y) denotes each pixel. Since dither processing is a technique to express a single tone by a plurality of pixels included in a matrix, a processing unit of mean value calculation performed by the mean value calculator 32 must be larger or equal to the size of the matrix. Assuming that the size of the dither matrix is n×m pixels and a processing unit of the mean value calculator 32 is N×M pixels, N≧n(≧2), M≧m(≧2) must be satisfied. The effect of the mean value calculator 32 would be reduced if the above conditions are not satisfied. The block area from P(1,1) to P(N,M) in FIG. 11 indicates the smallest processing unit of mean value calculation, and the mean value $P_{AVE}$ of the block is obtained by the following equation:

$$P_{AVE} = \sum_{y=1}^{M} \sum_{x=1}^{N} P(x, y) / (N \times M) \qquad (1)$$

By obtaining the mean value $P_{AVE}$ for each block, an effect of dither processing can be removed, making it possible to perform forthcoming non-linear conversion. By virtue of the conversion table 6 which performs non-linear conversion, it is possible to obtain image data approximated to the inputted image data. Therefore, the accuracy of image recognition of the specified document by the image recognition circuit 7 can be improved.

As set forth above, according to the fourth embodiment, it is possible to recognize an image with precision on the basis of Y, M, C and K or Y, M and C image data on which the RF conversion and pseudo half-tone processing e.g. dither processing or the like, has been performed. If an image of the specified document is determined, printing of the exact image of inputted image data can be impeded by, for instance, suspending the printing operation.

<Fifth Embodiment>

An image processing apparatus according to a fifth embodiment of the present invention will be described next. Note that in the fifth embodiment, the same reference numerals are assigned to compositional parts identical to those in the fourth embodiment and descriptions thereof will be omitted.

Figure 12:
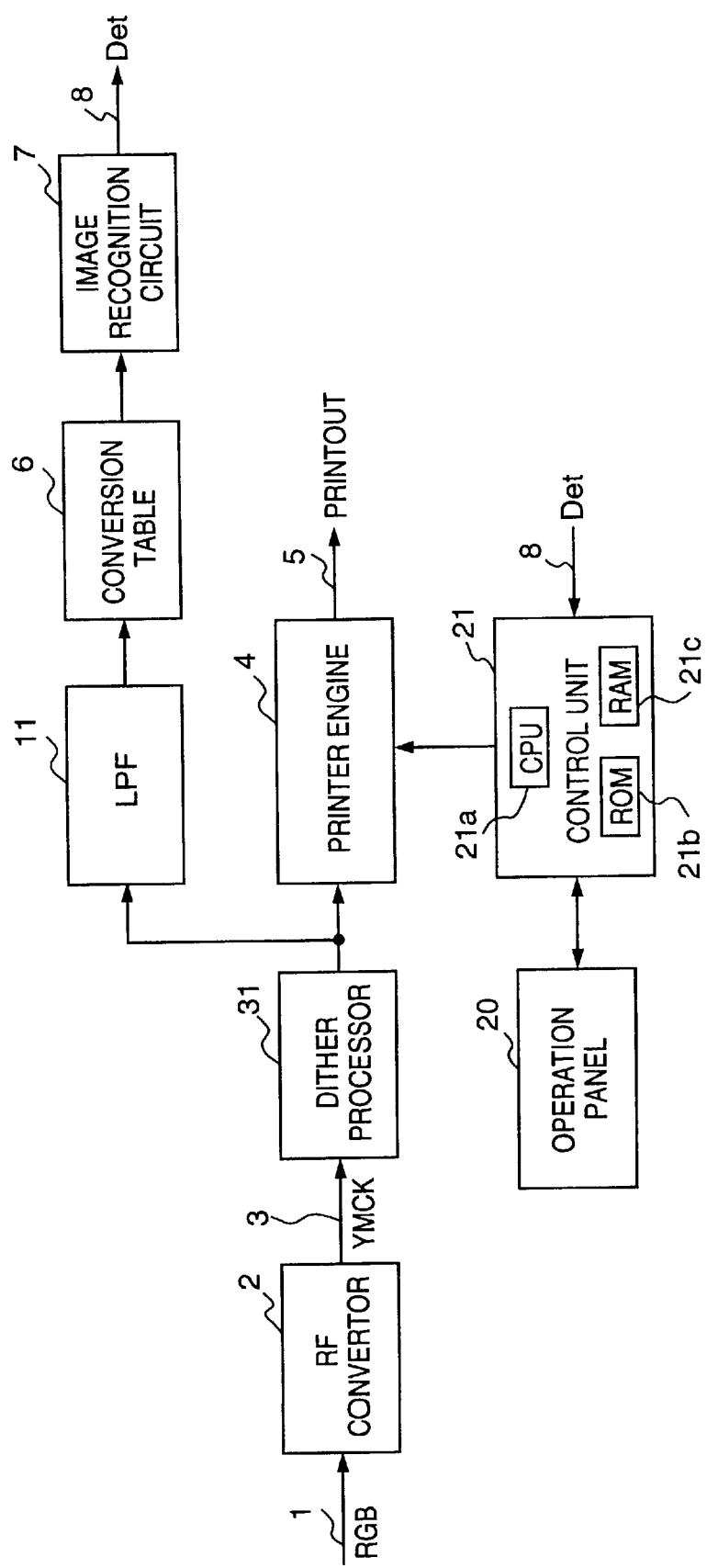
FIG. 12 is a block diagram showing an arrangement of an image processing apparatus according to the fifth embodiment of the present invention.

FIG. 12 is a block diagram showing an arrangement of an image processing apparatus according to the fifth embodiment of the present invention. The arrangement of the apparatus differs from that of the fourth embodiment in FIG. 10 by comprising, instead of the mean value calculator 32, a Low Pass Filter (LPF) 11 which limits a band of inputted image data in a two-dimensional space. The LPF 11 suppresses high frequency components and passes low frequency components of the image, making it possible to reduce the influence of the dither processor 31. Accordingly, it is possible to perform accurate image recognition even for the image data on which dither processing has been performed, as similar to the fourth embodiment. Note that the band pass of the LPF 11 needs to be lower than a frequency band of the dither processing. If the condition is not satisfied, the effect of band limitation would be reduced.

Note that in the foregoing fourth and fifth embodiments, an example has been provided in the case of applying dither processing. However, other pseudo half-tone processing such as the error diffusion method or the like can achieve the same effects as a matter of course, as long as the principle of the area halftone method is utilized.

Furthermore, the method of inverse conversion of the pseudo half-tone processing is not limited to mean value calculation or low pass filtering. Any method is applicable so long as the method aims at substantial restoration of the image data preceding the pseudo half-tone processing. Even if complete restoration of the image data is not achieved, it is acceptable as long as the method of inverse conversion results in data whose image is easily recognizable.

As has been described above, according to the fourth and fifth embodiments, image recognition can be performed with high precision on the basis of image data on which pseudo half-tone processing has been performed. If an image to be printed is determined as the specified document, printing of the exact image of the inputted image data is impeded by, for instance, suspending the printing operation.

<Sixth Embodiment>

An image processing apparatus according to a sixth embodiment of the present invention will be described below. In the sixth embodiment, the same reference numerals are assigned to compositional parts identical to those in the first embodiment and descriptions thereof will be omitted.

Figure 13:
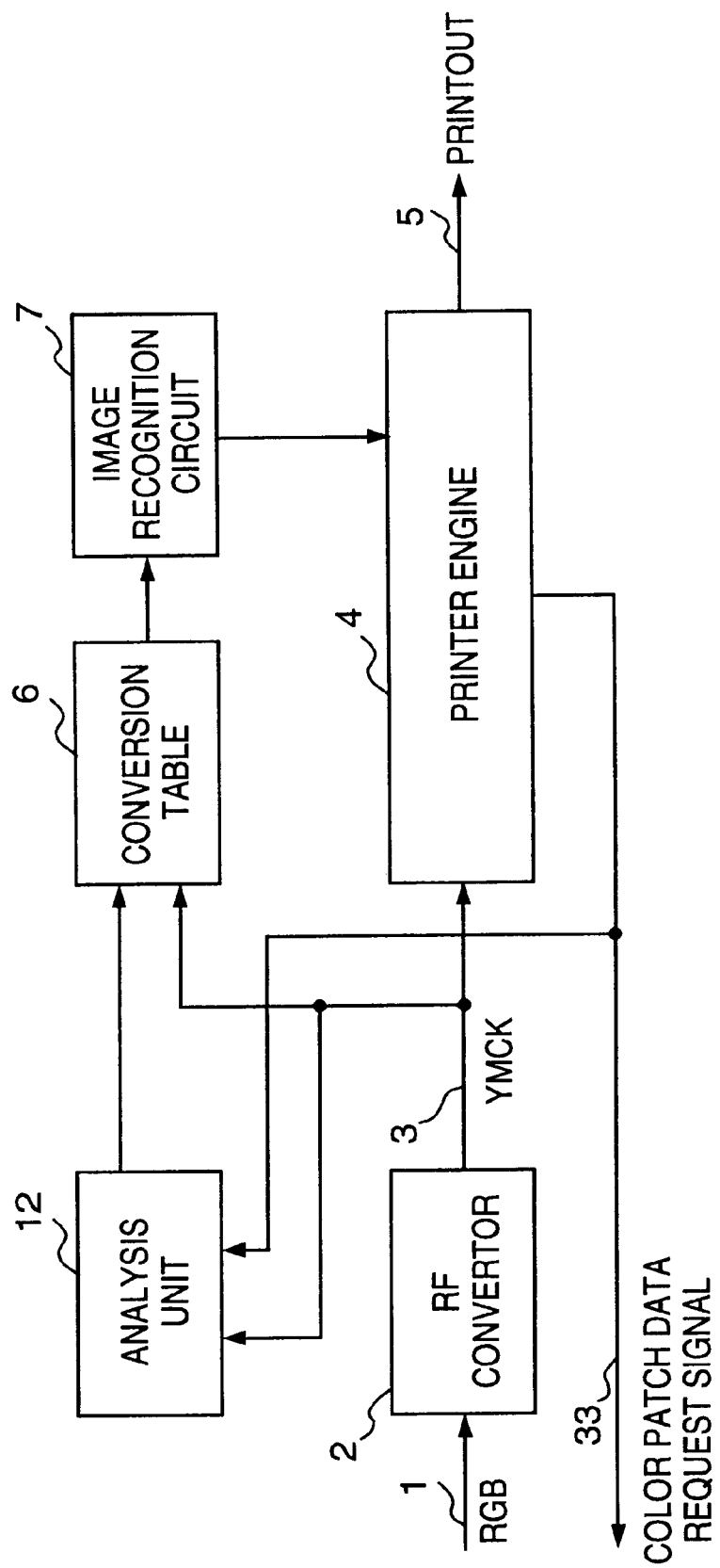
FIG. 13 is a block diagram showing an arrangement of an image processing apparatus according to the sixth embodiment of the present invention.

FIG. 13 is a block diagram showing an arrangement of an image processing apparatus according to the sixth embodiment of the present invention.

Y, M, C and K digital image signal 3 outputted from the RF converter 2 is inputted to the printer engine 4, the conversion table 6 constituted by RAM or the like, and analysis unit 12. The printer engine 4 outputs a printout 5, forming a color image on the basis of the image data outputted from the RF converter 2.

The digital image data converted by the conversion table 6 is inputted to the image recognition circuit 7 to determine whether or not an image represented by the converted digital image data is the specified document. If it is determined that the image is the specified document, the image recognition circuit 7 outputs a control signal to the printer engine 4 to impede printing of the exact image of the specified document, whereby suspending the printing operation by changing at least a part of the operation of processing means of a printer, or deforming the image data e.g., printing an all-black image.

Herein the conversion table of the conversion table 6 is set by the analysis unit 12. Operation of the setting is described below.

The printer engine 4 outputs a request signal 33 to the host computer (or to an image processing software driven on the host computer), which requests outputting of predetermined color patches data, at the time of initializing the apparatus, such as when power of the apparatus is turned on or the apparatus is reset, or at the time of changing a color space of inputted data by the operation panel 20. Herein, the printer engine 4 does not execute printing operation until the predetermined color patch data is inputted in accordance with the request signal 33.

Color patches data of the R, G and B color space outputted from the host computer in response to the request signal 33 is subjected to conversion and correction processing by the RF converter 2 and inputted to the analysis unit 12. Color patches data of the Y, M, C and K color space, obtained by performing conversion and correction processing on R, G and B digital image data representing predetermined color patches by the image processing software which has received the request signal 33, is passed through the RF converter 2 and inputted to the analysis unit 12.

The analysis unit 12 calculates correlation between the data inversely converted from the Y, M, C and K color space into the R, G and B color space, and the predetermined color patches data stored in an internal memory of the analysis unit 12. Based on the correlation, the most appropriate inverse conversion table data is calculated for inverse-converting Y, M, C and K image data, which has been converted from R, G and B image data by the RF converter 2, or which has been directly inputted, into R, G and B image data. The calculated conversion table data is then written in the conversion table 6.

On account of the conversion table 6 obtained in the above manner, an image signal inversely converted from the Y, M, C and K color space to the R, G and B color space is free of the above described influence of the color space conversion and the various correction processing performed by the RF converter 2 (or RF conversion performed by the image processing software).

Furthermore, by rewriting conversion table data of the conversion table 6 in the inverse RF conversion utilizing the color patches data, it is possible to surely remove the influence of the RF conversion even in the case where the characteristics of the conversion is unclear, e.g., RF conversion performed by the image processing software.

Accordingly, by virtue of the conversion table 6, it is possible to remove the influence of RF conversion from image data, resulting to enhance contrast of the image data, thereby improving accuracy of image recognition, e.g., improving accuracy of recognizing an image of the specified document.

As set forth above, according to the sixth embodiment, even in the case where RF conversion is performed on inputted R, G and B image data in the apparatus, or in the case where Y, M, C and K or Y, M and C image data on which RF conversion has been performed is directly inputted, accurate image recognition can be performed on the basis of the Y, M, C and K or Y, M and C image data. And when an image of the specified document is determined, it is possible to impede printing of the exact image of the specified document.

The present embodiment is particularly advantageous for generating inverse conversion table data in a case where the RF converter 2 is manufactured by another manufacturer and the conversion characteristics of the RF converter 2 is not known.

<Seventh Embodiment>

Hereinafter, an image processing apparatus according to a seventh embodiment of the present invention will be described. Note that in the seventh embodiment, the same reference numerals are assigned to compositional parts identical to those in the sixth embodiment and descriptions thereof will be omitted.

Figure 14:
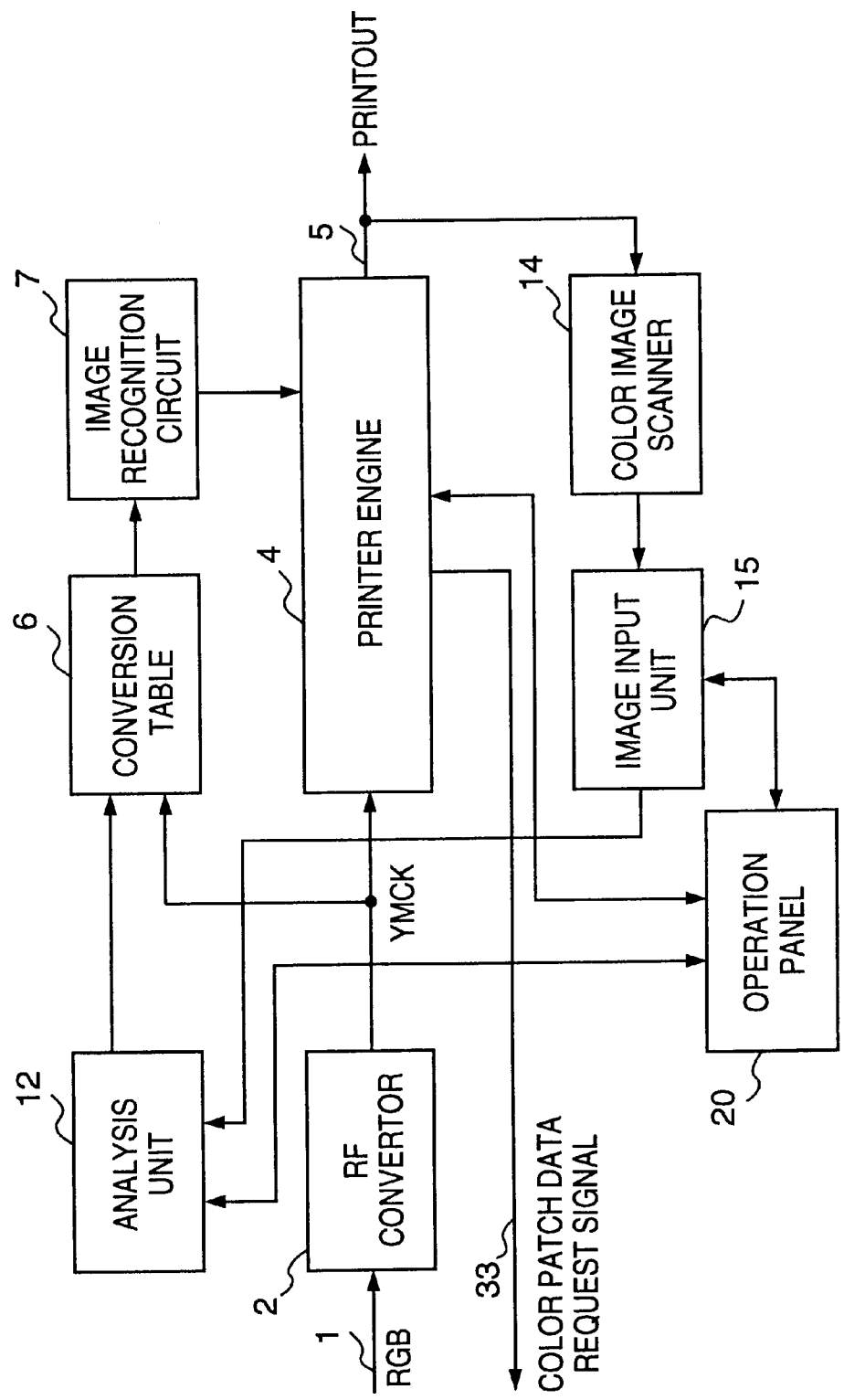
FIG. 14 is a block diagram showing an arrangement of an image processing apparatus according to the seventh embodiment of the present invention.

FIG. 14 is a block diagram showing an arrangement of an image processing apparatus according to the seventh embodiment of the present invention.

As similar to the sixth embodiment, the printer engine 4 prints out color patches data inputted in response to the request signal 33. An image input unit is then reads the printout 5 of the color patches data utilizing a color image scanner 14 complying with an instruction from the operation panel 20, and inputs the read image data of the R, G and B color space into the analysis unit 12. The analysis unit 12 calculates correlation in the same manner as the above described sixth embodiment, and inverse conversion table data obtained from the data indicative of the correlation is written in the conversion table 6.

Herein, when the request signal 33 is outputted, the printer engine 4 does not execute printing operation except for the image signal inputted in response to the request signal 33. Moreover, when the power of the apparatus is turned on, or apparatus is reset, or a color space of input data is changed, the control unit 21 functions to limit printing operation of the printer engine 4 until reading of the printout 5 is instructed and the analysis of the analysis unit 12 is normally completed.

Note that the color image scanner 14 is not necessarily embodied in the apparatus, but an external device such as a colorimeter or the like may be utilized. In this case, reading of the printout 5 is performed on a recording sheet or a recording medium, instead of on a photosensitive drum or a transfer drum.

<Modifications of the First to Seventh Embodiments>

In the foregoing embodiments, descriptions have been provided for a case where a color space of inputted image data is any of RGB, YMCK or YMC color spaces. However, the present invention is not limited to this color space, but may be applied to data of any arbitrary color space (e.g., Lab, Luv, YCrCb, XYZ, YIQ, HSI and so on) as a matter of course.

Further, the conversion table 6 and the image recognition circuit 7 may be provided for each of color component data. For instance, one of the color component data outputted from the conversion table may be selected in accordance with the processing color signal outputted from the printer engine 4, and may be inputted to the image recognition circuit 7 to perform image recognition. Moreover, for instance, it is also possible to control color component data selected in accordance with a print mode (the four-color print or the three-color print).

It is also possible to configure the apparatus such that process conditions of color space conversion and correction processing performed by the RF converter 2 can be changed from an external apparatus (e.g., host computer) or the operation panel 20. Process conditions can also be changed for each of the Y, M, C and K colors or can be altered in accordance with a print mode (four-color print in Y, M, C and K or three-color print in Y, M and C). The present invention is also applicable to such cases.

Furthermore, in the above described embodiments, conversion means is described as an LUT (Look-Up Table). However, the present invention is not limited to the LUT, but may employ any converter as long as single input data is converted to single output data, and may be constituted with a calculator, e.g., a multiplier or an adder, or a software and the like to achieve the above described effects.

An inverse conversion utilizing the conversion means needs not necessarily be the inverse conversion of all of color space conversion, UCR, masking, or density conversion, but may be an inverse conversion of only one of the above.

Moreover, with respect to accuracy of the inverse conversion by the conversion means, it is acceptable as long as the process aims at reducing the influence of a conversion process predeterminedly performed on the input image data, such as enhancing the contrast (dynamic range) of image data subjected to image recognition.

Furthermore, the image recognition circuit in the foregoing embodiment may be constituted with a substrate or a card independent from a printer body such as a printer engine, or as a unit such as a semiconductive chip. Further, the above described inverse conversion means may be added to the substrate, the card, or the semiconductive chip. Still further, the image recognition unit may be included in an image scanner or a copying machine, in addition to a printer.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention. In other words, each module realized by program codes realizes the function of each compositional part of the present embodiment and such module is readable by a computer.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 15B:
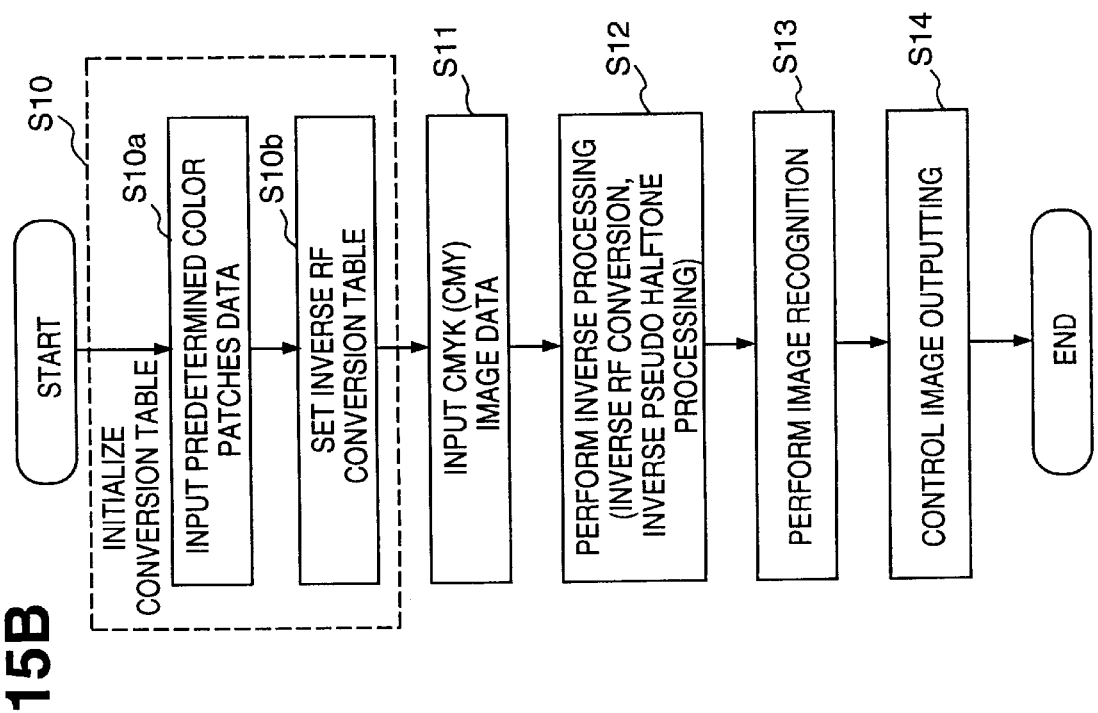
FIG. 15B is a flowchart showing a process according to the sixth and seventh embodiments of the present invention.
Figure 15A:
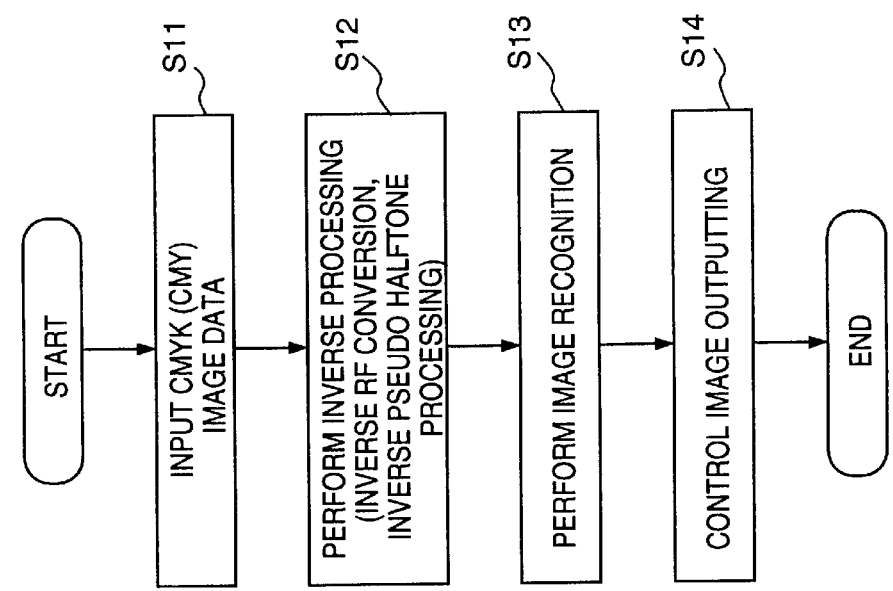
FIG. 15A is a flowchart showing a process according to the first to fifth embodiments of the present invention.
Figure 16:
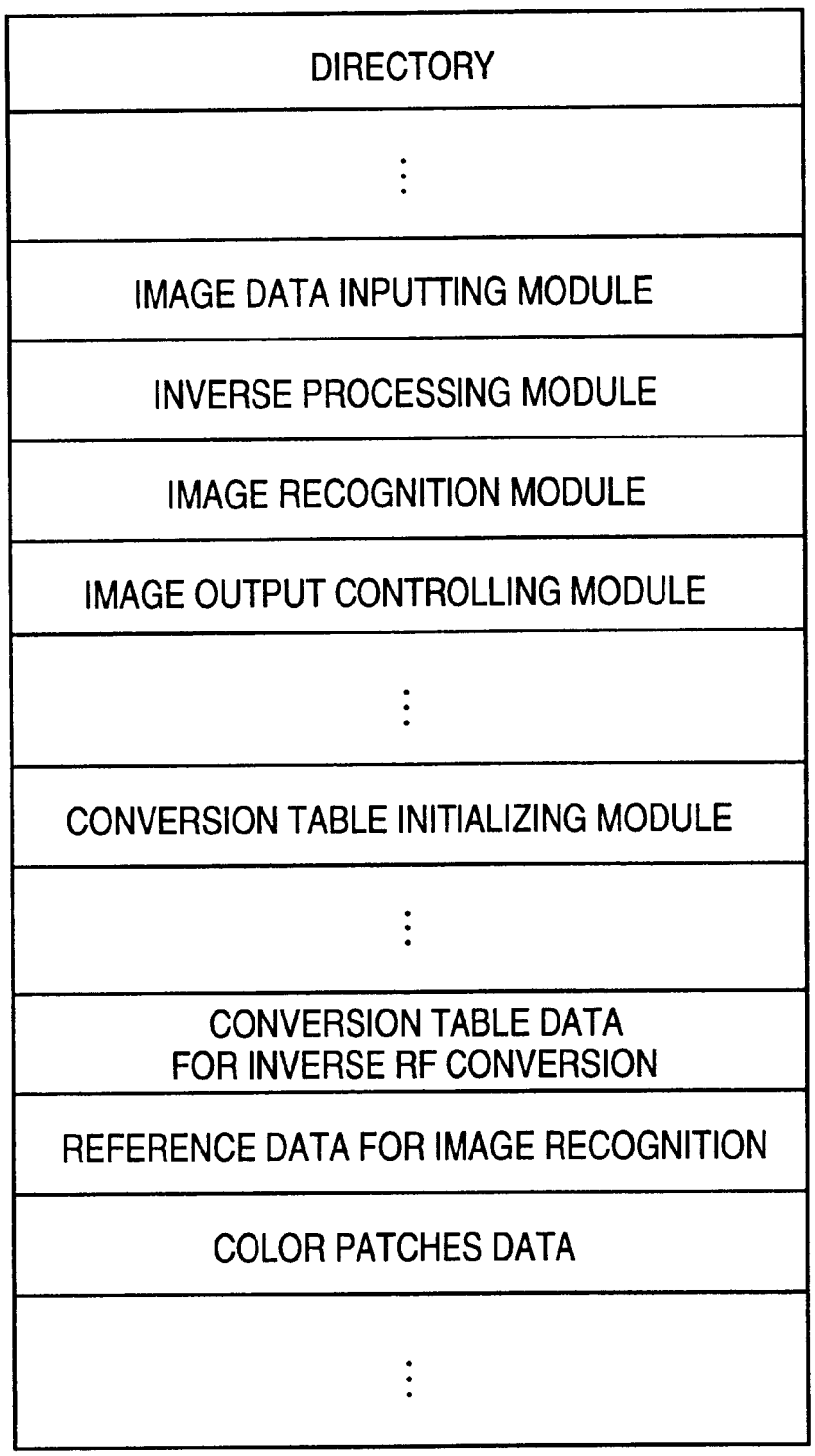
FIG. 16 is a diagram showing an example of a memory map utilized as a memory medium for storing program codes according to the present invention.

In the case where the present invention is applied to the aforementioned storage medium, in a simple description, the storage medium stores modules which realize a process performing at least the inverse processing (such as the inverse RF conversion and an inverse process of the pseudo halftone processing) and the image recognition, shown in flowcharts in FIGS. 15A or 15B. That is, the storage medium stores the modules shown in the memory map in FIG. 16. More specifically, program codes which correspond to "inverse RF conversion" module and "image recognition" module, at least, are to be stored in the storage medium.

The present invention is not limited to the above embodiments and various changes and modifications can be made within the spirit and scope of the present invention. Therefore, to appraise the public of the scope of the present invention, the following claims are made.

What is claimed is:

1. An image recognition apparatus, comprising:

inverse processing means for performing an inverse conversion process of a predetermined conversion process on inputted image data on which the predetermined conversion process has been performed, so as to obtain image data representing an image of which contrast is corrected; and recognition means for recognizing whether or not the image represented by the image data processed by said inverse processing means has a predetermined pattern.

2. The apparatus according to claim 1, further comprising output means for outputting a control signal for controlling an image processing apparatus in accordance with a recognition result obtained by said recognition means.

3. The apparatus according to claim 2, wherein said image processing apparatus comprising output means for performing printout operation in accordance with the inputted image data, wherein the control signal is a signal for controlling said output means not to perform normal printout operation when said recognition means recognizes an image of a specified document.

4. The apparatus according to claim 1, wherein the predetermined conversion process is a process for converting image data in luminance color space to image data in density color space.

5. The apparatus according to claim 1, wherein the predetermined conversion process includes at least one of UCR processing, masking processing and density correction processing.

6. The apparatus according to claim 1, wherein said inverse processing means utilizes different process conditions for each of color components of the image data.

7. The apparatus according to claim 6, wherein said inverse processing means includes a plurality of conversion means where different process conditions can be set.

8. The apparatus according to claim 6, further comprising output means for performing printout operation in accordance with the inputted image data, wherein said inverse processing means selects one of the different process conditions in accordance with a color component processed by said output means.

9. The apparatus according to claim 1, wherein said inverse processing means includes a plurality of conversion means where different process conditions are set, and said recognition means selects one of image data outputted from said plurality of conversion means in accordance with characteristics of the recognized image.

10. The apparatus according to claim 1, wherein said recognition means includes a plurality of recognition means which correspond to each color components of the image data.

11. An image recognition method comprising the steps of:

inputting image data on which a predetermined conversion process has been performed;

performing inverse conversion process of the predetermined conversion process on the inputted image data so as to obtain image data representing an image of which contrast is corrected; and recognizing whether or not the image represented by the image data on which the inverse conversion has been performed, has a predetermined pattern.

12. An image recognition apparatus, comprising:
inverse processing means for performing an inverse process of pseudo half-tone processing on inputted image data on which the pseudo half-tone processing has been performed; and
recognition means for recognizing whether or not an image represented by the image data processed by said inverse processing means has a predetermined pattern.

13. The apparatus according to claim 12, further comprising output means for outputting a control signal for controlling an image processing apparatus in accordance with a recognition result obtained by said recognition means.

14. The apparatus according to claim 12, wherein the inverse processing performed by said inverse processing means is processing for obtaining a mean value of the image data.

15. The apparatus according to claim 12, wherein the pseudo half-tone processing is a dither process, wherein a unit of pixels in which a mean value is obtained is equal to or larger than a dither matrix of the dither process.

16. The apparatus according to claim 12, wherein the inverse processing performed by said inverse processing means is to perform low-pass filtering on the image data.

17. The apparatus according to claim 12, wherein the pseudo half-tone processing is an area halftone process.

18. The apparatus according to claim 13, wherein said image processing apparatus comprising output means for performing printout operation in accordance with the inputted image data,
wherein the control signal is a signal for controlling said output means not to perform normal printout operation when said recognition means recognizes an image of a specified document.

19. An image recognition apparatus, comprising:
processing means for performing an inverse conversion process of a predetermined conversion process on inputted image data on which the predetermined conversion process has been performed, so as to obtain image data representing an image on which contrast is corrected, in accordance with a process condition set by a setting means; and
recognition means for recognizing whether or not the image represented by the image data processed by said inverse processing means has a predetermined pattern,
wherein said setting means obtains the process condition from inputted predetermined reference data.

20. An image processing apparatus, comprising:
first processing means for performing color space conversion and/or correction processing on inputted image data,
second processing means for performing an inverse process of the color space conversion and/or the correction processing on the image data on which the color space conversion and/or the correction processing has been performed, so as to obtain image data representing an image on which contrast is corrected, in accordance with a process condition set by a setting means;
recognition means for recognizing whether or not the image represented by the image data on which the inverse process has been performed, has a predetermined pattern; and
output means for controlling output of the image data on which the color space conversion and/or the correction processing has been performed, in accordance with a recognition result obtained by said recognition means,
wherein said setting means obtains the process condition from predetermined reference data inputted in a predetermined timing and processed by said first processing means.

21. The apparatus according to claim 20, wherein the predetermined reference data is predetermined color patches image data.

22. The apparatus according to claim 20, wherein the predetermined timing is a timing at which said apparatus performs initialization operation.

23. An image recognition method, comprising the steps of:
setting a process condition for an inverse conversion process of a predetermined conversion process;
performing the inverse conversion process on inputted image data on which the predetermined conversion process has been performed, so as to obtain image data representing an image on which contrast is corrected, in accordance with the set process condition; and
recognizing whether or not the image represented by the image data on which the inverse conversion process has been performed, has a predetermined pattern,
wherein in said setting step, the process condition is obtained from inputted predetermined reference data.

24. An image processing method comprising:
a setting step of setting a process condition for an inverse process of color space conversion and/or correction processing;
a first processing step of performing the color space conversion and/or the correction process on inputted image data;
a second processing step of performing the inverse process on the image data on which the color space conversion and/or the correction processing has been performed, so as to obtain image data representing an image of which contrast is corrected, in accordance with the set process condition;
a recognition step of recognizing whether or note the image represented by the image data on which the inverse process has been performed, has a predetermined pattern; and
an output step of controlling output of the image data on which the color space conversion and/or the correction processing has been performed, in accordance with a recognition result obtained in said recognition step,
wherein in said setting step, the process condition is obtained from predetermined reference data inputted in a predetermined timing and processed in said first processing step.

25. A computer program product comprising a computer-usable medium having computer-readable program code means embodied in said medium for an image recognition method, said product including:
first computer-readable program code means for inputting image data on which a predetermined conversion process has been performed;
second computer-readable program code means for performing an inverse conversion process of the predetermined conversion process on the inputted image data so as to obtain image data representing an image of which contrast is corrected; and
third computer-readable program code means for recognizing whether or not the image represented by the image data on which the inverse conversion has been performed, has a predetermined pattern.

26. A computer program product comprising a computer-usable medium having computer-readable program code means embodied in said medium for an image recognition method, said product including:

first computer-readable program code means for setting a process condition for an inverse conversion process of a predetermined conversion process;

second computer-readable program code means for performing the inverse conversion process on inputted image data on which the predetermined conversion process has been performed, so as to obtain image data representing an image of which contrast is corrected, in accordance with the set process condition; and third computer-readable program code means for recognizing whether or not the image represented by the image data on which the inverse conversion process has been performed, has a predetermined pattern, wherein in the setting process, the process condition is obtained from inputted predetermined reference data.

27. A computer program product comprising a computer-usable medium having computer-readable program code means embodied in said medium for an image recognition method, said product including:

first computer-readable program code means for setting a process condition for an inverse conversion process of a predetermined conversion process;

second computer-readable program code means for performing the inverse conversion process on inputted image data on which the predetermined conversion process has been performed, in accordance with the set process condition; and third computer-readable program code means for recognizing an image represented by the image data on which the inverse conversion process has been performed, wherein in the setting process, the process condition is obtained from inputted predetermined reference data.

28. A computer program product comprising a computer-usable medium having computer-readable program code means embodied in said medium for an image processing method, said product including:

first computer-readable program code means for setting a process condition for an inverse process of color space conversion and/or correction processing;

second computer-readable program code means for performing the color space conversion and/or correction processing on inputted image data;

third computer-readable program code means for performing the inverse process on the image data on which the color space conversion and/or the correction processing has been performed, so as to obtain image data representing an image on which contrast is corrected, in accordance with the set process condition;

fourth computer-readable program code means for recognizing whether or not the image represented by the image data on which the inverse process has been performed, has a predetermined pattern; and fifth computer-readable program code means for controlling output of the image data on which the color space conversion and/or the correction processing has been performed, in accordance with a recognition result obtained in the recognition process, wherein in the setting process, the process condition is obtained from predetermined reference data inputted in a predetermined timing and processed by the color space conversion and/or correction processing.

29. An image recognition apparatus comprising:

an eliminating processor for performing image processing on input image data subjected to a predetermined conversion process, wherein the image processing eliminates deterioration of image quality caused by the predetermined conversion process from the input image data; and a recognizing processor for recognizing whether or not an image represented by the image data subjected to the image processing is a predetermined image, wherein the image processing includes a process corresponding to the inverse of the predetermined conversion process.

30. The apparatus according to claim 29, wherein the predetermined conversion process reduces data amount of image data.

31. The apparatus according to claim 29, wherein the predetermined conversion process binarizes image data.

32. The apparatus according to claim 29, wherein the input image data is inputted by an external computer.

33. The apparatus according to claim 29, wherein when said recognizing processor recognizes the image represented by the image data is the predetermined image, an image being faithful to the input image data is not outputted.

34. An image recognition method comprising the steps of:

performing image processing on input image data subjected to a predetermined conversion process, wherein the image processing eliminates deterioration of image quality caused by the predetermined conversion process from the input image data; and recognizing whether or not an image represented by the image data subjected to the image processing is a predetermined image, wherein the image processing includes a process corresponding to the inverse of the predetermined conversion process.

35. A computer program product comprising a computer readable medium having a computer program code, for an image recognition, said product comprising procedure codes for:

performing image processing on input image data subjected to a predetermined conversion process, wherein the image processing eliminates deterioration of image quality caused by the predetermined conversion process from the input image data; and recognizing whether or not an image represented by the image data subjected to the image processing is a predetermined image, wherein the image processing includes a process corresponding to the inverse of the predetermined conversion process.

* * * * *

UNITED STATES PATENT AND TRADEMARK OFFICE
CERTIFICATE OF CORRECTION

PATENT NO. : 6,108,098
DATED : August 22, 2000
INVENTOR(S) : Mitsuru Owada et al.

It is certified that error appears in the above-identified patent and that said Letters Patent is hereby corrected as shown below:

Title page,
Please insert the following between "[22] Filed" and "[51] Int. Cl.":
-- [30] Foreign Application Priority Data
Dec. 28, 1995  [JP]  Japan .......................... 7-343876
Dec. 28, 1995  [JP]  Japan .......................... 7-343877
Dec. 28, 1995  [JP]  Japan .......................... 7-343878 --.

Item [56], References Cited, U.S. PATENT DOCUMENTS, please insert the following:

| | | | |
|---|---|---|---|
| -- 5,363,202 | 11/1996 | Udagawa et al. | 358/501 |
| 5,633,952 | 5/1997 | Outa et al. | 382/165 |
| 5,621,810 | 4/1997 | Suzuki et al. | 385/135 |
| 5,621,503 | 4/1997 | Komaki et al. | 399/366 |
| 5,583,667 | 12/1996 | Yamada | 358/529 |
| 5,583,614 | 12/1996 | Suzuki | 358/450 |
| 5,541,741 | 7/1996 | Hasuo et al. | 382/165 |
| 5,481,377 | 1/1996 | Udagawa et al. | 358/501 |
| 5,465,161 | 11/1995 | Funada et al. | 358/438 |
| 5,463,469 | 10/1995 | Funada et al. | 358/296 |
| 5,457,540 | 10/1995 | Kajita | 358/296 |
| 5,434,649 | 7/1995 | Hasuo et al. | 399/366 |
| 5,430,525 | 7/1995 | Ohta et al. | 399/366 |
| 5,426,710 | 6/1995 | Suzuki et al. | 382/135 |
| 5,424,852 | 6/1995 | Funada | 358/448 |
| 5,424,807 | 6/1995 | Ohmura | 399/366 |
| 5,418,602 | 5/1995 | Nishikawa | 399/366 |
| 5,363,454 | 11/1994 | Udagawa et al. | 382/165 |
| 5,363,202 | 11/1994 | Udagawa et al. | 358/501 |
| 5,335,291 | 8/1994 | Kramer et al. | 382/158 |
| 5,321,470 | 6/1994 | Hasuo et al. | 399/366 |
| 5,313,312 | 5/1994 | Yamada | 358/505 |
| 5,257,119 | 10/1993 | Funada et al. | 358/438 |
| 2,521,023 | 10/1993 | Arimoto et al. | 358/529 |
| 5,227,871 | 7/1993 | Funada et al. | 382/165 |
| 5,216,724 | 5/1993 | Suzuki et al. | 382/135 |
| 5,194,945 | 3/1993 | Kadowaki et al. | 358/520 |
| 5,193,121 | 3/1993 | Elischer et al. | 382/138 |
| 5,189,528 | 2/1993 | Takashima et al. | 358/448 |
| 5,166,810 | 11/1992 | Sorimachi et al. | 358/462 |

UNITED STATES PATENT AND TRADEMARK OFFICE
CERTIFICATE OF CORRECTION

PATENT NO. : 6,108,098
DATED : August 22, 2000
INVENTOR(S) : Mitsuru Owada et al.

It is certified that error appears in the above-identified patent and that said Letters Patent is hereby corrected as shown below:

| | | | |
|---|---|---|---|
| 5,134,667 | 7/1992 | Suzuki.................... | 382/164 |
| 5,132,786 | 7/1992 | Ishiwata.................. | 358/500 |
| 5,113,248 | 5/1992 | Hibi et al. ............... | 358/501 |
| 5,055,834 | 10/1991 | Chiba..................... | 382/135 |
| 5,050,224 | 9/1991 | Mori....................... | 382/216 |
| 4,996,591 | 2/1991 | Kodowaki et al. ......... | 358/519 |
| 4,989,042 | 1/1991 | Muramatsu et al. ....... | 358/401 |
| 4,985,778 | 1/1991 | Ayata et al. .............. | 358/296 |
| 4,937,662 | 6/1990 | Matsunawa et al. ....... | 358/538 |
| 4,924,328 | 5/1990 | Endoh et al. ............. | 360/60 |
| 4,908,873 | 3/1990 | Philibert et al. ........... | 382/100 |
| 4,905,097 | 2/1990 | Watanabe et al. ......... | 358/456 |
| 4,881,268 | 11/1898 | Uchida et al. ............. | 382/135 |
| 4,873,570 | 10/1989 | Suzuki et al. ............. | 358/518 |
| 4,807,027 | 2/1989 | Muto...................... | |
| 4,723,149 | 2/1988 | Harada ................... | 398/366 |
| 4,723,129 | 2/1988 | Endo et al. ............... | |
| 4,769,532 | 9/1998 | Kawakami................ | 382/135 |
| 4,270,146 | 5/1981 | Adachi..................... | 358/453 |
| 4,270,143 | 5/1981 | Morris..................... | |
| 3,713,097 | 1/1973 | Linnerooth et al. ........ | 382/309 -- |

Item [56], References Cited, please insert the following:

-- FOREIGN PATENT DOCUMENTS

| | | |
|---|---|---|
| 0506479 | 9/1992 | Europe |
| 0463804 | 1/1992 | Europe |
| 0342060 | 11/1989 | Europe |
| 0312301 | 4/1989 | Europe |
| 0273398 | 7/1988 | Europe |
| 2053619 | 2/1981 | Great Britian |
| 0382549 | 8/1990 | Europe |
| 79059936 | 5/1979 | Japan |
| 5022593 | 1/1993 | Japan |
| 6113132 | 4/1994 | Japan |
| 6113133 | 4/1994 | Japan |
| 4016707 | 1/1992 | Japan |
| 0335232 | 3/1989 | Germany -- |

UNITED STATES PATENT AND TRADEMARK OFFICE
CERTIFICATE OF CORRECTION

PATENT NO. : 6,108,098
DATED : August 22, 2000
INVENTOR(S) : Mitsuru Owada et al.

It is certified that error appears in the above-identified patent and that said Letters Patent is hereby corrected as shown below:

Title page, cont'd
Item [56], References Cited, please insert the following:
-- OTHER PUBLICATIONS
PROCEEDINGS - The International Society for Optical Engineering, "Image Processing Algorithms And Techniques" Keith S. Pennington et al., 12-14, Feb. 1990, Santa Clara, Vol. 1244.

PATENT ABSTRACTS OF JAPAN, Vol. 11, No. 93. (P559) (2540), March 24, 1987, JP 61-246773 (A), Ricoh Co. Ltd, Masayuki Shinada.

PATENT ABSTRACTS OF JAPAN, Vol. 13, No. 269 (P-888) (3617), June 21, 1989, JP 1-61777 (A), Fuji Photo Film Co. Ltd, Atsushi Takagi. --

Column 4,
Line 49, "luminancedensity" should read -- luminance-density --.

Column 10,
Line 59, "by" should read -- may be effected by --.

Column 11,
Line 41, "is" should read -- are --.

Column 12,
Line 8, "is" should read -- 15 --.

Column 14,
Line 2, "appraise" should read -- apprise --.

UNITED STATES PATENT AND TRADEMARK OFFICE
CERTIFICATE OF CORRECTION

PATENT NO. : 6,108,098
DATED : August 22, 2000
INVENTOR(S) : Mitsuru Owada et al.

It is certified that error appears in the above-identified patent and that said Letters Patent is hereby corrected as shown below:

Column 16,
Line 39, "note" should read -- not --.

Signed and Sealed this

Nineteenth Day of February, 2002

Attest:

JAMES E. ROGAN
*Director of the United States Patent and Trademark Office*

*Attesting Officer*